(12) United States Patent
Fang et al.

(10) Patent No.: US 12,407,903 B2
(45) Date of Patent: Sep. 2, 2025

(54) REFERENCE VIDEO QUALITY MEASUREMENT FEEDBACK

(71) Applicant: T-Mobile USA, Inc., Bellevue, WA (US)

(72) Inventors: Zheng Fang, McLean, VA (US); George Jason Schnellbacher, Leawood, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 20 days.

(21) Appl. No.: 18/158,464

(22) Filed: Jan. 23, 2023

(65) Prior Publication Data
US 2024/0251138 A1    Jul. 25, 2024

(51) Int. Cl.
H04N 21/234    (2011.01)
H04N 21/2187    (2011.01)
H04N 21/61    (2011.01)
H04N 21/6379    (2011.01)

(52) U.S. Cl.
CPC ..... *H04N 21/6131* (2013.01); *H04N 21/2187* (2013.01); *H04N 21/234* (2013.01); *H04N 21/6379* (2013.01)

(58) Field of Classification Search
None
See application file for complete search history.

(56) References Cited

U.S. PATENT DOCUMENTS

| | | | |
|---|---|---|---|
| 7,020,093 B2* | 3/2006 | Sirivara | H04N 21/6125 370/395.2 |
| 9,060,191 B2* | 6/2015 | Chhaochharia | H04L 47/25 |
| 9,491,219 B2* | 11/2016 | Venkatasubramaniam | H04L 65/80 |
| 10,165,286 B2 | 12/2018 | Sze et al. | |
| 2004/0098748 A1* | 5/2004 | Bo | H04L 1/0002 725/105 |
| 2008/0117930 A1* | 5/2008 | Chakareski | H04L 1/0002 370/465 |
| 2009/0153668 A1* | 6/2009 | Kim | H04N 21/654 348/180 |

(Continued)

OTHER PUBLICATIONS

"European Search Report Application No. 24152765.4", Mailed Date: May 27, 2024, 10 Pages.

*Primary Examiner* — William J Kim
(74) *Attorney, Agent, or Firm* — Foley IP Law, PLLC

(57) ABSTRACT

Approaches to preventing degraded video presentation use reference video quality measurement feedback from a video decoder node that is receiving live action video streams from a video encoder across a cellular network. A reference video stream is encoded along with the live action video streams, and the video decoder node compares the decoded reference video stream with a local copy to determine video quality. The video decoder node provides video encoding parameter feedback for adjusting the encoding and/or provides cellular network feedback for adjusting a transmission parameter for data traffic through the cellular network (from the video encoder node to the video decoder node). Solutions are disclosed for implementation at the video encoder, at the video decoder, and within the cellular network. For example, different compression codecs may be specified, and bit rates, frame, rates, key frame intervals, and/or bit depth may be automatically (immediately) adjusted without requiring human intervention.

17 Claims, 12 Drawing Sheets

(56) References Cited

U.S. PATENT DOCUMENTS

| | | | |
|---|---|---|---|
| 2010/0057928 A1* | 3/2010 | Kapoor | G06F 16/4387 709/231 |
| 2010/0215053 A1* | 8/2010 | Chakareski | H04L 47/10 370/465 |
| 2010/0259625 A1* | 10/2010 | Yamada | H04N 21/4347 348/E17.005 |
| 2012/0013748 A1* | 1/2012 | Stanwood | H04L 47/2408 348/192 |
| 2012/0278441 A1* | 11/2012 | Li | H04L 65/70 709/219 |
| 2013/0044803 A1* | 2/2013 | Fisher | H04N 21/8455 709/231 |
| 2013/0055331 A1 | 2/2013 | Karacali-Akyamac | |
| 2013/0148741 A1 | 6/2013 | Steinberg et al. | |
| 2013/0188060 A1 | 7/2013 | Steinberg et al. | |
| 2013/0286879 A1* | 10/2013 | ElArabawy | H04N 21/26208 370/252 |
| 2013/0298170 A1* | 11/2013 | ElArabawy | H04L 47/2416 725/62 |
| 2014/0294362 A1* | 10/2014 | Pettersson | H04N 17/004 386/264 |
| 2015/0026309 A1* | 1/2015 | Radcliffe | H04L 65/612 709/219 |
| 2015/0142702 A1* | 5/2015 | Nilsson | G06N 20/00 706/14 |
| 2015/0341646 A1* | 11/2015 | Sze | H04N 21/631 375/240.26 |
| 2016/0105728 A1* | 4/2016 | Schmidmer | H04N 21/64723 725/110 |
| 2016/0335754 A1* | 11/2016 | Aaron | H04N 21/4666 |
| 2016/0337680 A1* | 11/2016 | Kalagi | H04N 21/23439 |
| 2017/0085616 A1* | 3/2017 | Botsford | H04L 65/70 |
| 2018/0115475 A1* | 4/2018 | Broom | H04N 21/44209 |
| 2018/0270524 A1* | 9/2018 | Jones | H04N 21/23439 |
| 2018/0302455 A1* | 10/2018 | Bordoloi | H04N 19/115 |
| 2019/0020909 A1* | 1/2019 | Petajan | H04N 21/234363 |
| 2019/0158564 A1* | 5/2019 | Wang | H04L 41/5067 |
| 2020/0169736 A1* | 5/2020 | Petajan | H04N 19/154 |
| 2020/0314503 A1* | 10/2020 | Wang | H04N 21/2402 |
| 2020/0322694 A1* | 10/2020 | Colligan | H04N 21/8547 |
| 2022/0321892 A1 | 10/2022 | Liu et al. | |
| 2022/0415046 A1 | 12/2022 | Zhang | |

* cited by examiner

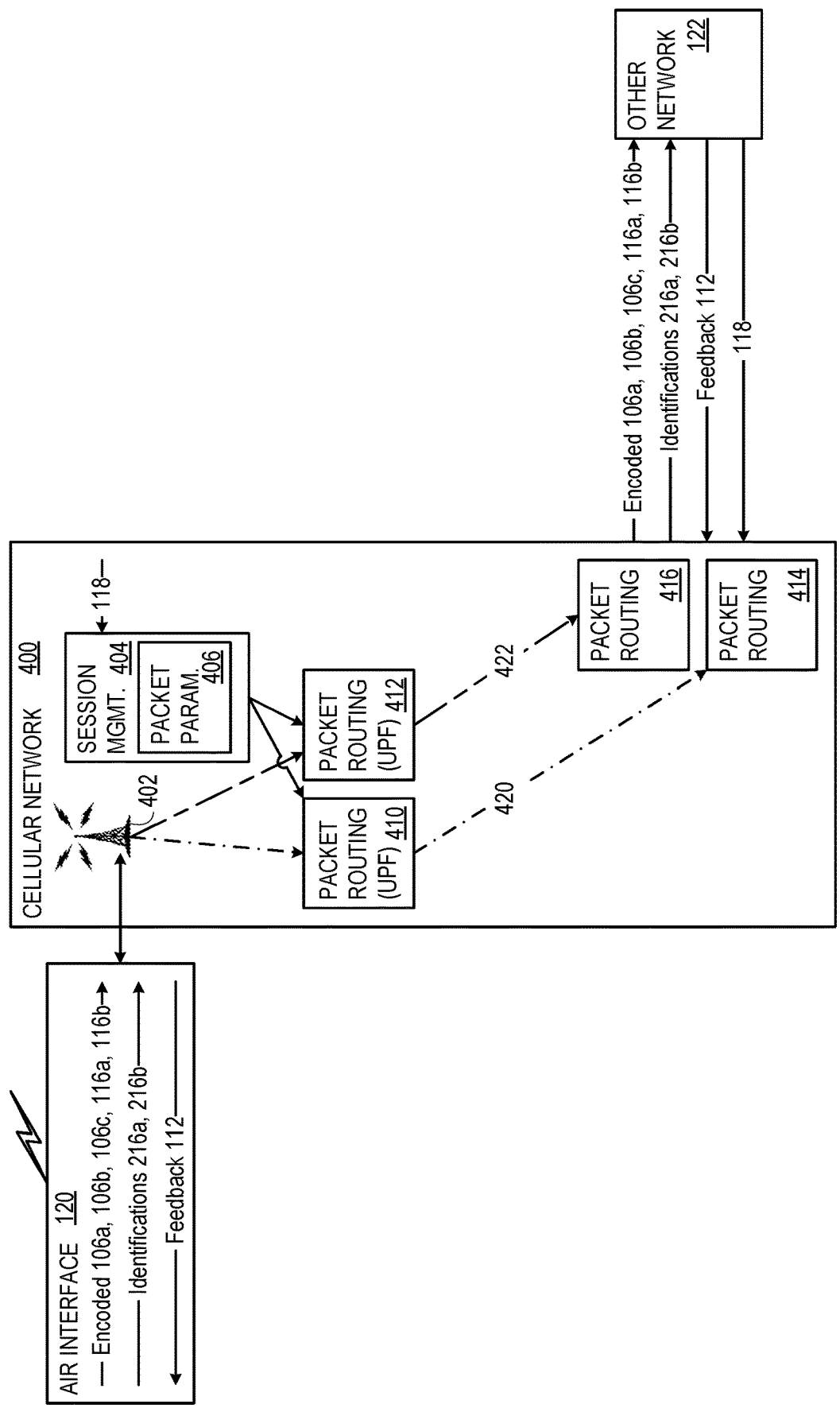

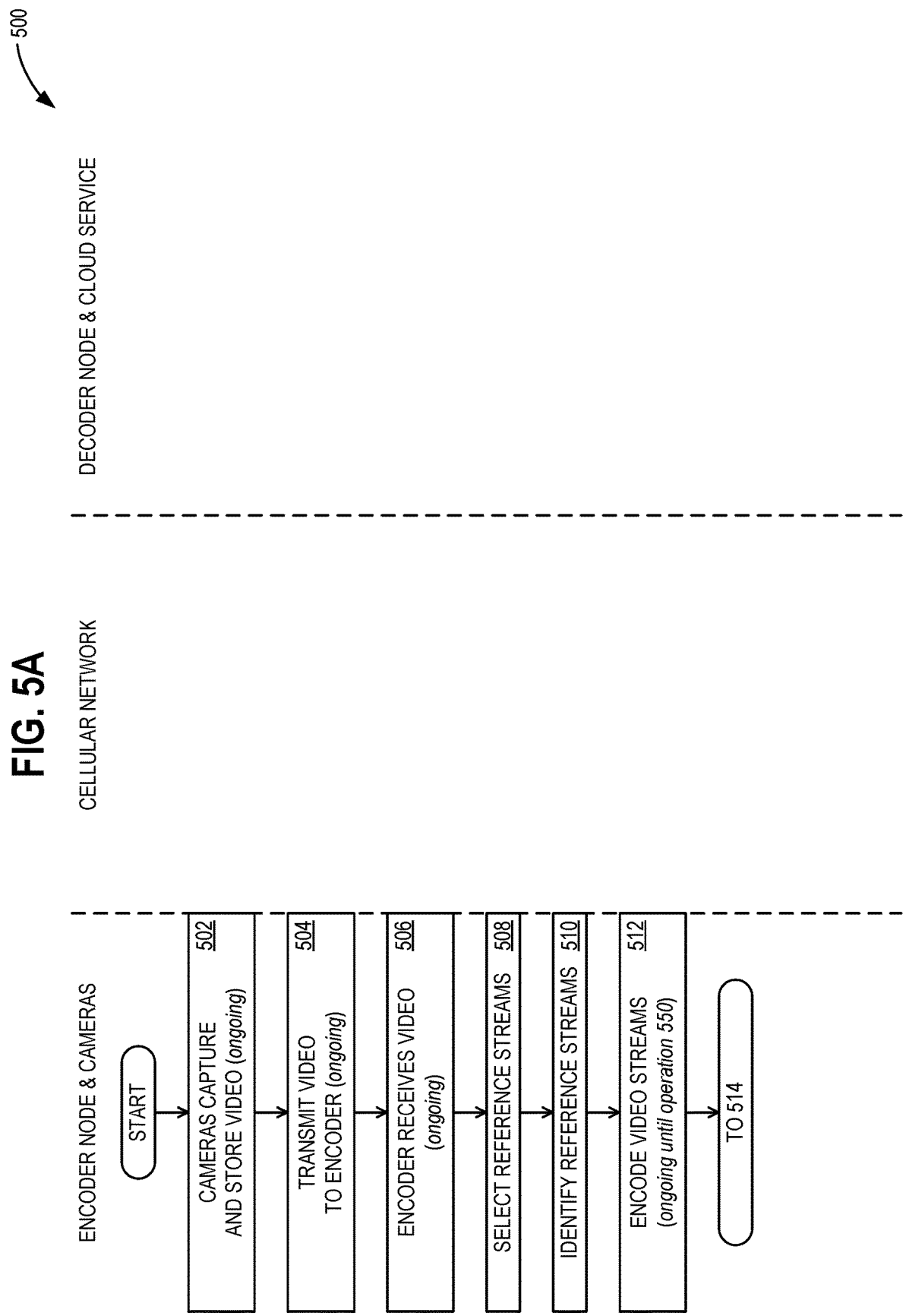

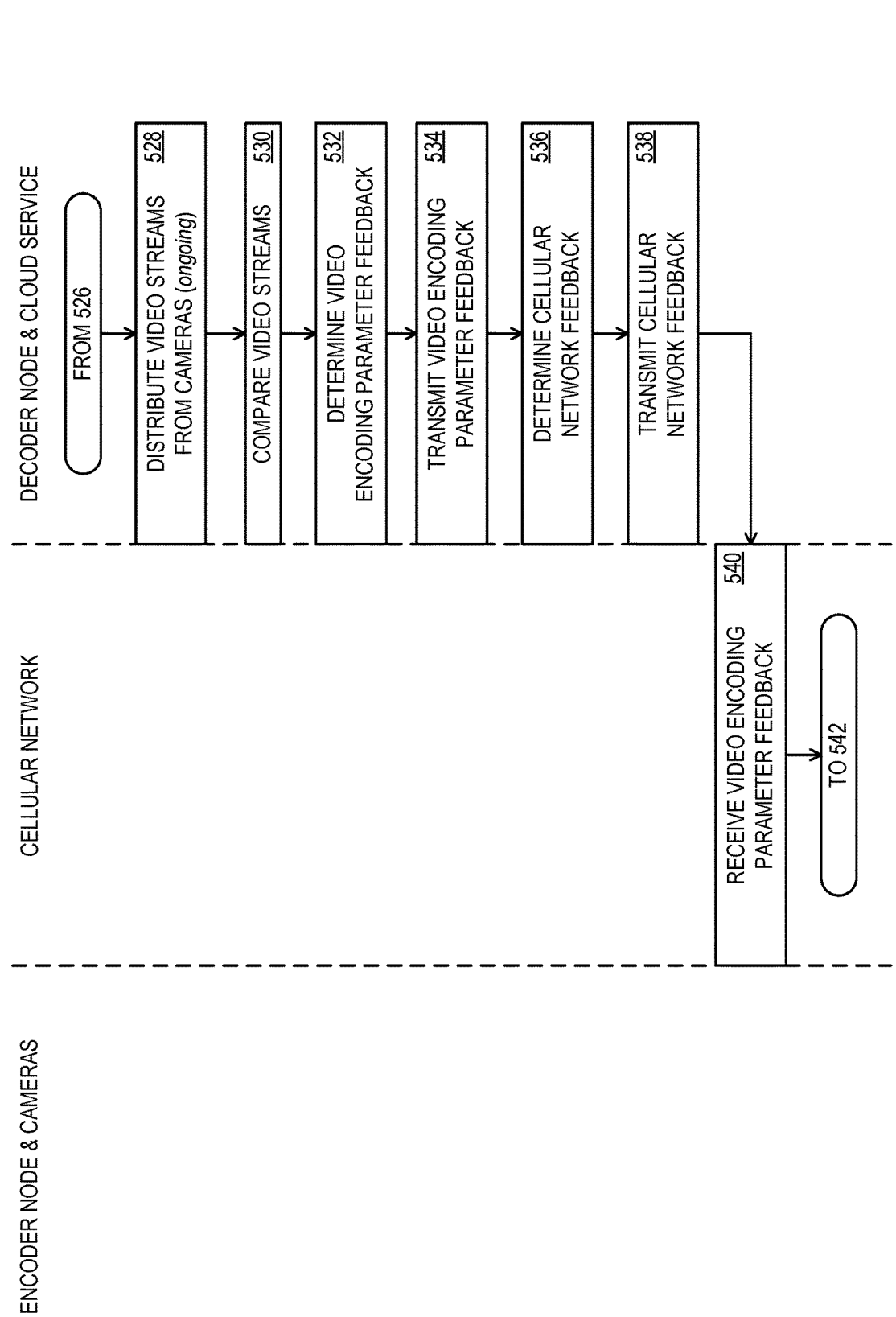

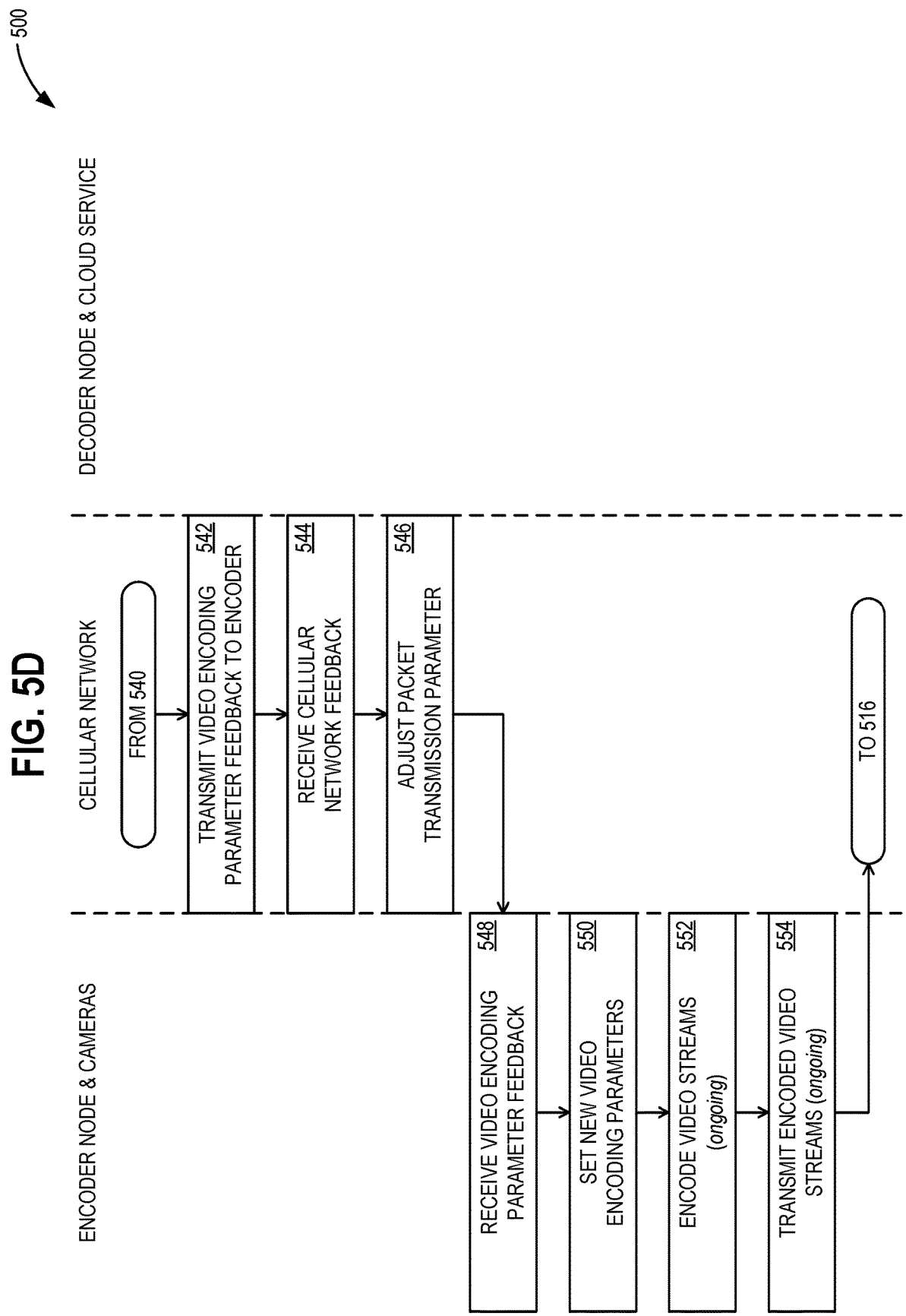

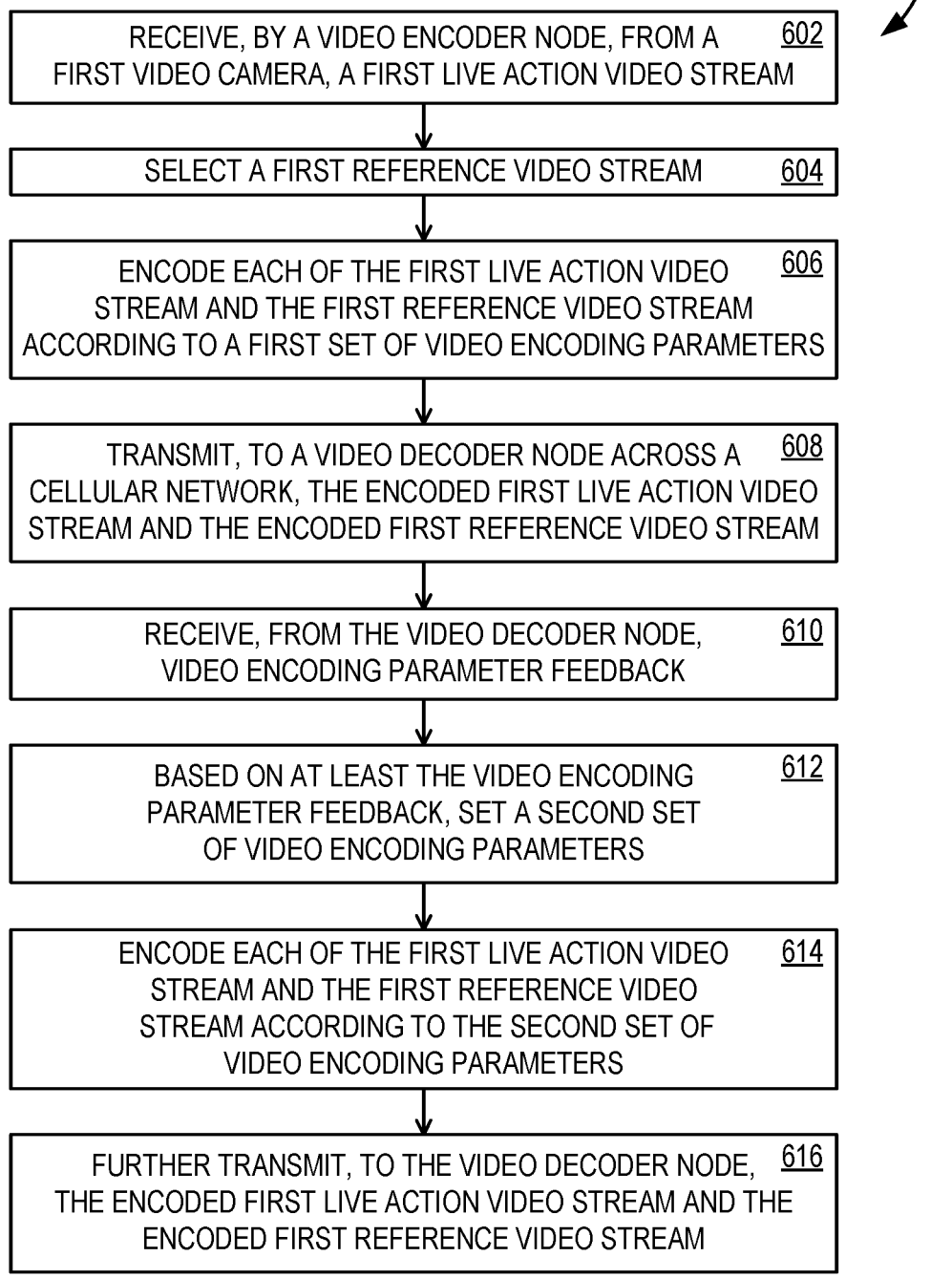

REFERENCE VIDEO QUALITY MEASUREMENT FEEDBACK

BACKGROUND

The high bandwidth of fifth generation (5G) cellular networks open up new options for video production projects, such as permitting a bank of multiple cameras at a remote live action filming site, which does not support wired connectivity, to be monitored in real-time by dispersed video production team members in real-time. Under favorable conditions, a 5G air interface supports sufficient bandwidth for multiple simultaneous live action video streams, captured at the filming site, to be transmitted via a wireless modem to a base station, where it can then be carried across a wired network to a video distribution location for distribution among the video production team members.

Unfortunately, cellular network performance has some degree of unpredictability. Not only may the air interface for a particular base station be congested, but since the cellular network carries other traffic for other users to/from other base stations, end-to-end data traffic performance may suffer (e.g., lost packets and packet delay) due to congestion through the cellular carrier's core network. Further, any other intervening network between the demarcation of the cellular network and the video distribution location, whether the internet or a dedicated private network, may also suffer performance degradation, outside the control of the cellular network operator. The result is a degraded video presentation to the video production team members, which may adversely impact a video production project.

SUMMARY

The following summary is provided to illustrate examples disclosed herein, but is not meant to limit all examples to any particular configuration or sequence of operations.

Disclosed approaches to reference video quality measurement feedback include: receiving, by a video encoder node, from a first video camera, a first live action video stream; selecting a first reference video stream; encoding each of the first live action video stream and the first reference video stream according to a first set of video encoding parameters; transmitting, to a video decoder node across a cellular network, the encoded first live action video stream and the encoded first reference video stream; receiving, from the video decoder node, video encoding parameter feedback; based on at least the video encoding parameter feedback, setting a second set of video encoding parameters; encoding each of the first live action video stream and the first reference video stream according to the second set of video encoding parameters; and further transmitting, to the video decoder node, the encoded first live action video stream and the encoded first reference video stream.

Further disclosed approaches to reference video quality measurement feedback include: receiving, by a video decoder node, from a video encoder node across a cellular network, an encoded first live action video stream and an encoded first reference video stream, the encoded second live action video stream and the encoded second reference video stream encoded according to the first set of video encoding parameters; decoding the first live action video stream and the first reference video stream; selecting a first comparison video stream; and based on at least a comparison of the first reference video stream with the first comparison video stream, transmitting, to the video encoder node, video encoding parameter feedback.

Further disclosed approaches to reference video quality measurement feedback include: receiving, by a cellular network, from a video encoder node, an encoded first live action video stream and an encoded first reference video stream, the encoded first live action video stream and the encoded first reference video stream encoded according to a first set of video encoding parameters; transmitting, to a video decoder node, the encoded first live action video stream and the encoded first reference video stream; receiving, from the video decoder node, video encoding parameter feedback; transmitting, to the video encoder node, the video encoding parameter feedback; receiving, from the video decoder node, cellular network feedback; and based on at least receiving the cellular network feedback, adjusting at least one packet transmission parameter for data traffic from the video encoder node to the video decoder node.

BRIEF DESCRIPTION OF THE DRAWINGS

The disclosed examples are described below with reference to the accompanying drawing figures listed below, wherein:

FIG. 4 illustrates further detail for the cellular network of FIG. 1;

FIGS. 5A-8 illustrate flowcharts of exemplary operations associated with examples of the architecture of FIG. 1.

Figure 1:
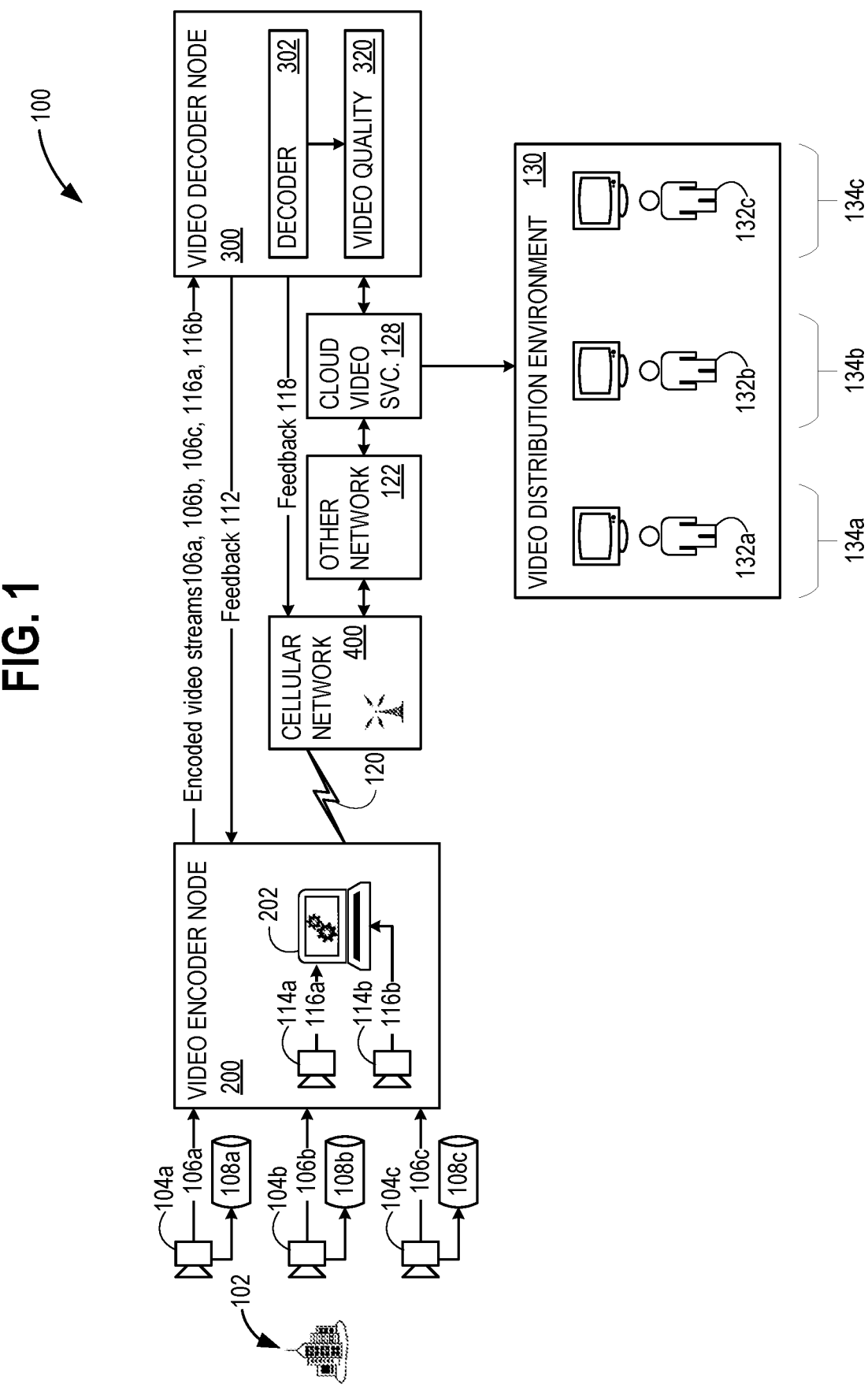
FIG. 1 illustrates an exemplary architecture that advantageously provides reference video quality measurement feedback for automatic adjustment of video streaming encoding.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Approaches to preventing degraded video presentation use reference video quality measurement feedback from a video decoder node that is receiving live action video streams from a video encoder across a cellular network. A reference video stream is encoded along with the live action video streams, and the video decoder node compares the decoded reference video stream with a local copy to determine video quality. The video decoder node provides video encoding parameter feedback for adjusting the encoding and/or provides cellular network feedback for adjusting a transmission parameter for data traffic through the cellular network (from the video encoder node to the video decoder node). Solutions are disclosed for implementation at the video encoder, at the video decoder, and within the cellular network. For example, different compression codecs may be specified, and bit rates, frame, rates, key frame intervals, bit depth and/or other encoding parameters may be automatically (immediately) adjusted without requiring human intervention.

Aspects of the disclosure improve objectively-measured video quality metrics for video streams passing through cellular networks. This provides a useful, practical change in the operation of video distribution arrangements and is enabled, at least in part, by the video encoder receiving video encoding parameter feedback from the video decoder node and setting a new set of video encoding parameters based on at least the video encoding parameter feedback. The practical results are further enabled, at least in part, by the video encoder transmitting the video encoding parameter feedback to the video encoder node, based on at least a comparison of a reference video stream with a comparison video stream, and the cellular network receiving cellular network feedback from the video decoder node and adjusting at least one packet transmission parameter for data traffic from the video encoder node to the video decoder node based on at least receiving the cellular network feedback. With reference now to the figures, FIG. 1 illustrates an architecture 100 that advantageously provides reference video quality measurement feedback for automatic adjustment of video streaming encoding. With architecture 100, video production that relies on a cellular network for distributing video streams to dispersed team members becomes a closed loop arrangement. This has advantages over current open loop video production, in which live streaming over a cellular network lacks a video quality value indication on the application layer from the intermediate receiver (e.g., the proxy server in the cloud or elsewhere) back to the sender or from final receivers (e.g., team member locations) back to the sender.

In architecture 100, video production, a live scene 102 is being captured by a plurality of cameras, such as camera 104a, camera 104b, and camera 104c. Some examples use a different number of cameras. In the illustrated example, each camera has local storage for captured live action video and transmits a live action video stream to a video encoder 202 at a video encoder node 200. For example, camera 104a has a storage 108a for its captured live action video and transmits live action video stream 106a to video encoder node 200; camera 104b has a storage 108b for its captured live action video and transmits live action video stream 106b to video encoder node 200; and camera 104c has a storage 108c for its captured live action video and transmits live action video stream 106c to video encoder node 200. In some examples, the live action video stored by each camera is raw video (which may be processed further at a later time), and the transmitted live action video stream is processed and/or compressed for transmission and immediate (real-time) viewing.

A video encoder 202 within video encoder node 200 encodes live action video streams 106a-106c for transmission to cloud video service 128 for further distribution to video production team members in a video distribution environment 130. In some examples, video encoder 202 and/or other functionality described herein for video encoder node 200 is implemented using a notebook personal computer (PC). Video production team members include team member 132a at a first geographic location 134a, team member 132b at a second geographic location 134b, and team member 132c at a third geographic location 134c.

In some examples, cloud video service 128 reduces the resolution and/or frame rate for at least some of the distributed video within video distribution environment 130. For example, team member 132a may be viewing the distributed video on a large monitor, whereas team member 132b is viewing the distributed video on a standard size notebook computer monitor, and team member 132b is viewing the distributed video on a personal device, such as a cellular telephone. As a result, each of team members 132a-132c receives a custom-resolution video stream selected from one or more of live action video streams 106a-106c.

Geographic location 134a-134c may be dispersed from each other and also from live scene 102. Because live scene 102 is at a remote location, in the illustrated example, such that a cabled connection is unavailable for the entirety of the path between video cameras 102a-102c and cloud video service 128, video encoder node 200 relies on an air interface 120 to a cellular network 400. In some examples, cellular network 400 comprises a fifth generation (5G) cellular network. In some examples, there may also be another network, such as the internet shown as other network 122, may be used to carry encoded live action video streams 106a-106c from cellular network 400 to cloud video service 128.

To provide the closed loop functionality, a set of small reference video streams, shown as reference video stream 116a and a reference video stream 116b, from a respective one of a notional virtual camera 114a and a notional virtual camera 114b, are encoded by video encoder 202 and injected into the set of video streams sent by video encoder node 200. Reference video streams 116a and 116b are not generally intended for viewing by team members 132a-132c, and so may not be distributed in video distribution environment 130, but are instead intended for video quality diagnostic purposes. Some examples may use a different number of reference video streams and live action video streams.

Network latency and packet loss, either due to congestion or failures in cellular network 400 and/or other network 122 may affect video quality of streaming live action video. Thus, encoded reference video streams 116a and 116b travel through cellular network 400 and other network 122 along with encoded live action video streams 106a-106c so that any degradation in the live action video streams 106a-106c, as received by cloud video service 128, also likely impacts reference video streams 116a and 116b.

A video decoder 302 at video decoder node 300 decodes the received encoded reference video streams 116a and 116b and encoded live action video streams 106a-106c and a video quality assessor 320 determines video quality metrics that indicate whether the received video streams are degraded. In some examples, each of reference video streams 116a and 116b and live action video streams 106a-106c are encoded with the same set of video encoding parameters, which provides a direct estimate of the degradation of live action video streams 106a-106c by assessing the quality of reference video streams 116a and 116b. However, in some examples, one or both of reference video streams 116a and 116b is encoded differently than live action video streams 106a-106c (which, in some further examples, are encoded differently than each other).

For example, reference video stream 116a is selected in order to mimic live action video stream 106a (e.g., similar image complexity, motion, frame rate, and other aspects), and reference video stream 116b is selected in order to mimic live action video stream 106b. With identical encoding for each, the video quality of live action video stream 106a is estimated using the measured video quality of reference video stream 116a and the video quality of live action video stream 106b is estimated using the measured video quality of reference video stream 116b.

In another example, both reference video streams 116a and 116b are selected in order to mimic live action video stream 106a, with reference video stream 116a encoded the same as live action video stream 106a and reference video stream 116b encoded with different video encoding parameters. In this scenario, the video quality of live action video stream 106a is still estimated using the measured video quality of reference video stream 116a, however the video quality resulting from encoding live action video stream 106a with the different video encoding parameters may be predicted by the measured video quality of reference video stream 116a. With this second scheme, a new set of encoding parameters may be tested for suitability for given network conditions before the encoding is changed.

Video decoder node 300 provides video encoding parameter feedback 112 to video encoded node 200 to use in adjusting the video encoding parameters in order to meet desired video quality metrics. In some examples, video decoder node 300 also provides cellular network feedback 118 to cellular network 400 so that cellular network 400 is alerted to adjust packet transmission (e.g., routing and/or priority) of the packets carrying reference video streams 116a and 116b and live action video streams 106a-106c. In some examples, video decoder node 300 is located separately from cloud video service 128. In some examples, the functionality described herein for video decoder node 300 is located within cellular network 400, within other network 122, or is included within the functionality provided by cloud video service 128. In some examples, the functionality described herein for video decoder node 300 is provided in multiple locations within architecture 100 (e.g., within cloud video service 128, and separately, elsewhere).

Figure 2:
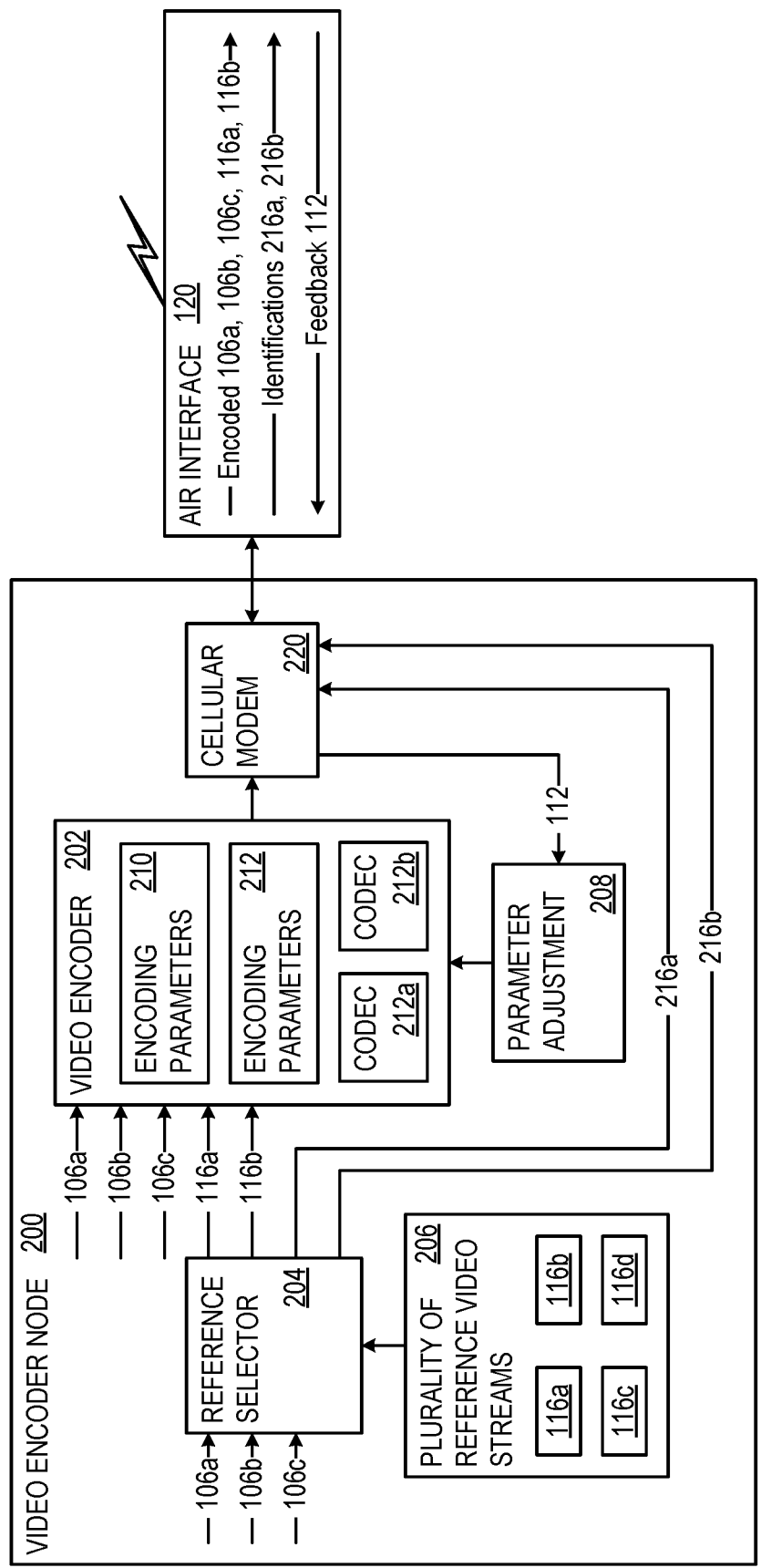
FIG. 2 illustrates further detail for the video encoder node of FIG. 1.

FIG. 2 illustrates further detail for video encoder node 200. A reference video stream selector 204 receives some or all of live action video streams 106a-106 and selects reference video streams 116a and 116b from a plurality of reference video streams 206 within a library of reference video streams. Plurality of reference video streams 206 has a variety of reference video streams with varying degrees of image complexity that span the demand on inter-frame compression (i.e., compression of the single image of a key frame), as well as varying degrees of motion that span the demand on intra-frame compression (i.e., compression across multiple images of a key frame interval).

For example, plurality of reference video streams 206 has reference video streams 116a and 116b, along with a reference video stream 116c and another reference video stream 116d. Reference video stream selector 204 selects reference video stream 116a due to its similarity to live action video stream 106a and further reference video stream 116b due to its similarity to live action video stream 106b. Reference video stream selector 204 sends reference video streams 116a and 116b to video encoder 202 and sends identification 216a of reference video stream 116a and identification 216b of reference video stream 116b to a cellular modem 220 for multiplexing with encoded reference video streams 116a and 116b and encoded live action video streams 106a-106c.

Video encoder 202 receives reference video streams 116a and 116b from reference video stream selector 204 and live action video streams 106a-106c from cameras 104a-104c. In some examples, encodes video encoder 202 encodes all of the received video streams with a common set of video encoding parameters, for example, set of video encoding parameters 210. Video encoder 202 sends encoded reference video streams 116a and 116b and encoded live action video streams 106a-106c to cellular modem 220 for transmission to video decoder node 300 and cloud video service 128. Cellular modem 220 transmits encoded reference video streams 116a and 116b and encoded live action video streams 106a-106c, along with identification 216a of reference video stream 116a and identification 216b of reference video stream 116b, using air interface 120 (e.g., a 5G air interface).

Cellular modem 220 receives video encoding parameter feedback 112 from video decoder node 300 across cellular network 400 and through air interface 120. Parameter adjustment 208 then adjusts the video encoding parameters used by video encoder 202 for subsequent encoding of reference video streams 116a and 116b and encoded live action video streams 106a-106c. For example, parameter adjustment 208 instructs video encoder 202 to use a different set of video encoding parameters 212 in place of set of video encoding parameters 210.

Sets of video encoding parameters 212 may include specification of the bit rate, identification of a compression codec, resolution (e.g., in terms of pixels), frame rate (e.g., 30 or 60 frames per second), bit depth (e.g., specifying color depth), and a key frame interval. For some video compression algorithms, frames are categorized into three different frame types. I-frames (key frames) are sent as a compete image for a key frame interval, also known as a group of pictures (GOP) in which intra-image compression is performed using P-frames and B-frames. P-frames are predicted frames using only prior frames, and B-frames are bi-directional frames that are reconstructed using both prior and following frames within the current key frame interval.

To perform the video encoding (which includes compression), video encoder 202 has multiple video codecs, shown as codec 212a and codec 212b. Examples include H.264 and H.265, and others. In general, H.265 may be preferred to H.264 but is more susceptible to degradation with high motion and poor network throughput.

Figure 3:
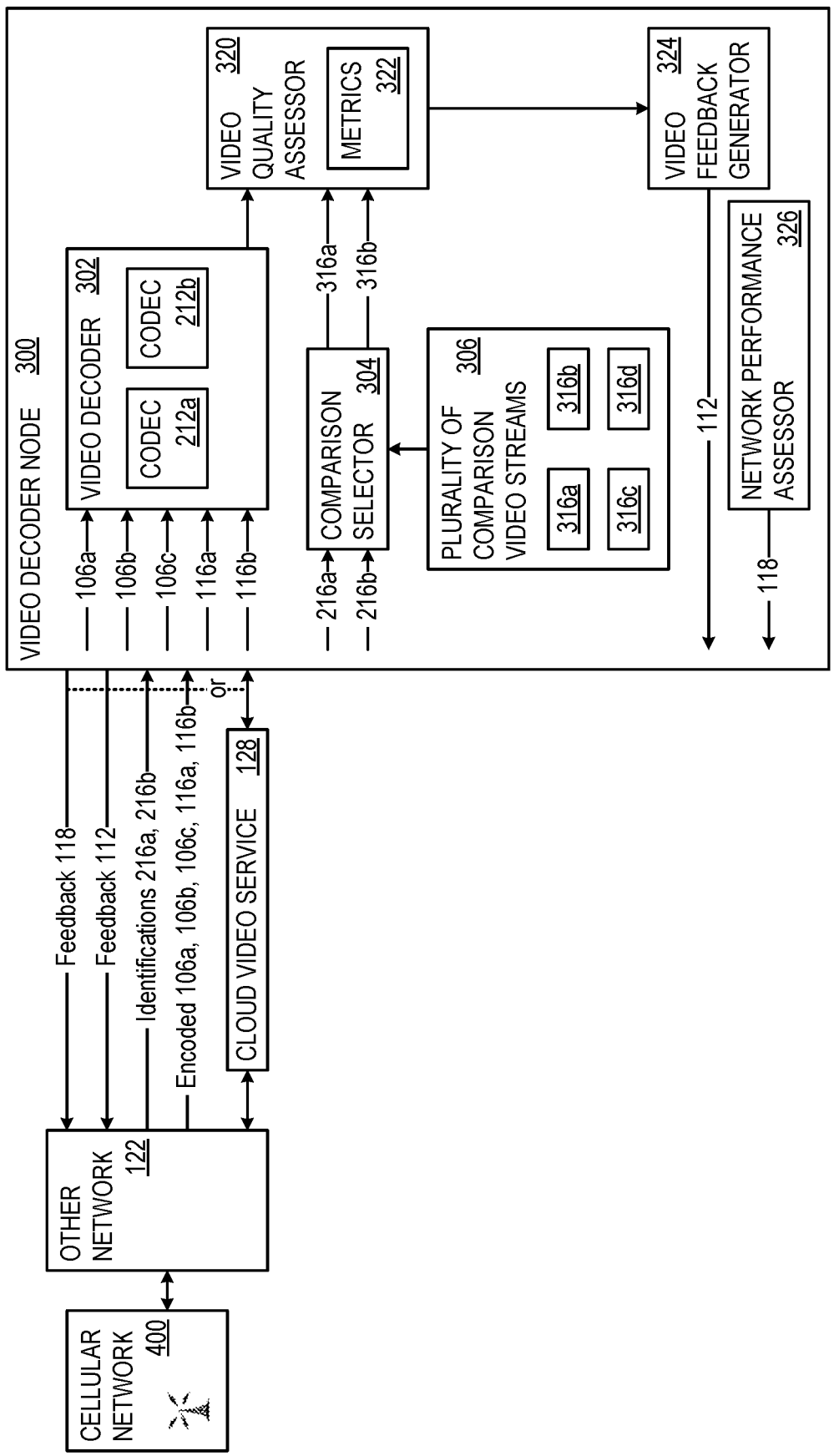
FIG. 3 illustrates further detail for the video decoder node of FIG. 1.
Figure 5B:
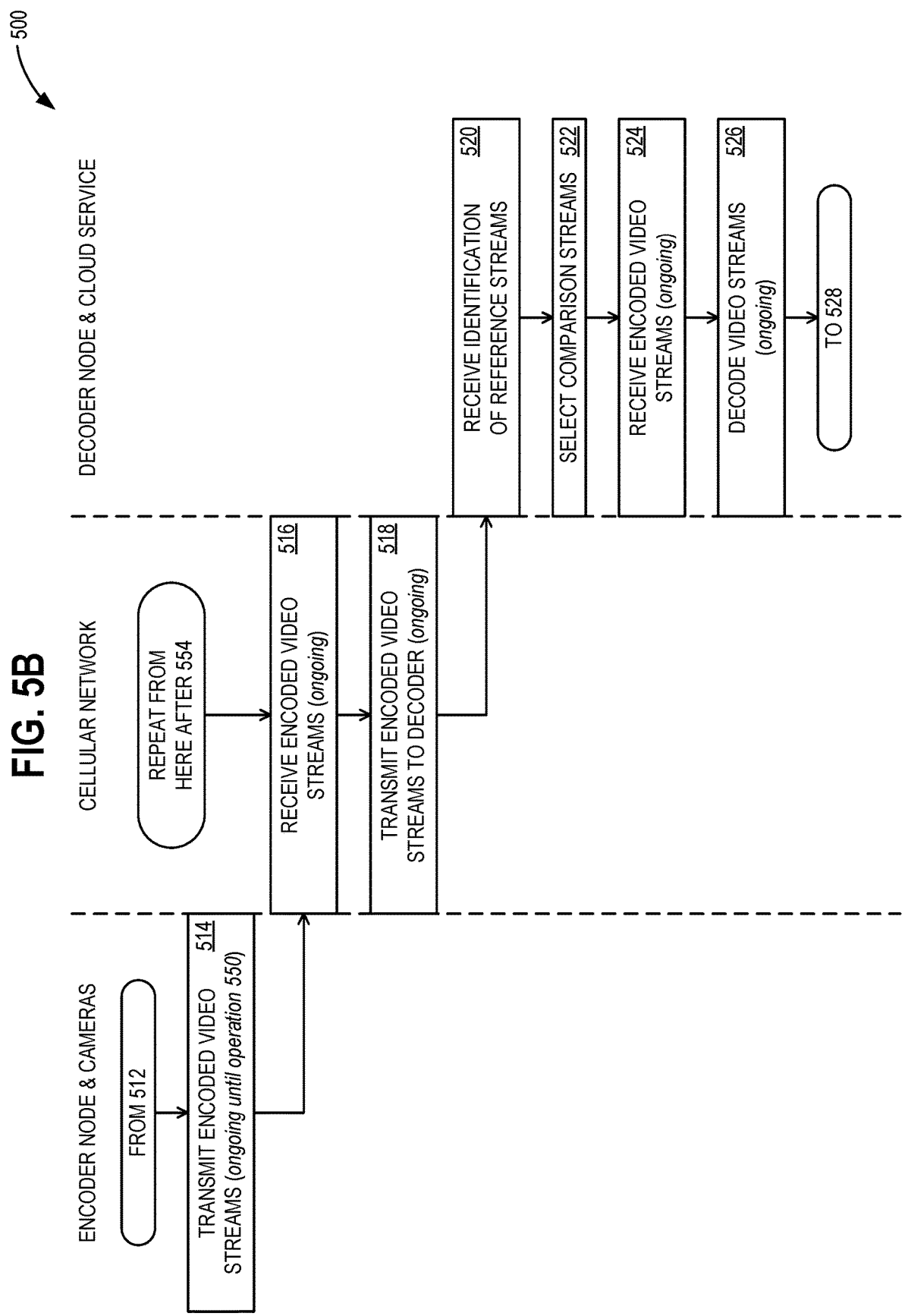

FIG. 3 illustrates further detail for video decoder node 300. Video decoder node 300 receives encoded live action video streams 106a-106c, reference video streams 116a and 116b, identification 216a of reference video stream 116a, and identification 216b of reference video stream 116b through cellular network 400. In some examples, the video streams and identifications of the reference video streams are received through other network 122 and/or through cloud video service 128. In some examples, the video streams are received from cloud video service 128, whereas the identifications of the reference video streams are received through other network 122.

Video decoder 202 has its own copies of codec 212a and 212b to decode the encoded video streams and sends decoded reference video streams 116a and 116b to video quality assessor 320. Video decoder node 300 has its own local copy of plurality of reference video streams 206, shown as plurality of comparison video streams 306. Comparison video stream 316a is the same as reference video stream 116a, comparison video stream 316b is the same as reference video stream 116b, comparison video stream 316c is the same as reference video stream 116c, and comparison video stream 316d is the same as reference video stream 116d.

A comparison video stream selector 304 at video decoder node 300 receives identification 216a of reference video stream 116a and identification 216b. Comparison video stream selector 304 selects corresponding comparison video streams 316a and 316b (for reference video streams 116a and 116b, respectively) and sends them to video quality assessor 320.

Video quality assessor 320 is then able to perform a full reference (FR) video quality assessment of received reference video streams 116a and 116b to determine video quality metrics 322. FR video quality assessment computes the quality difference between a received video stream and a local clean copy of the same video stream. In some examples, video quality assessor 320 comprises a machine learning (ML) model. Video quality metrics 322 may include a set of standard metrics, such as peak signal-to-noise ratio (PSNR), structural similarity (SSIM), SSIMplus (e.g., SSIM with further ML assessment), and video multi-method assessment fusion (VMAF).

A video feedback generator 324 generates video encoding parameter feedback 112 using video quality metrics 322. In some examples, video encoding parameter feedback 112 merely represents video quality metrics 322, whereas in some examples, video feedback generator 324 determines recommended changes to set of video encoding parameters 210. That is, various examples may locate the logic to translate from video quality metrics 322 into new set of video encoding parameters 212 in video feedback generator 324, parameter adjustment 208, or across both. Video decoder node 300 transmits video encoding parameter feedback 112 to video encoder node 200 across cellular network 400.

In some examples, video encoder node 200 also has a network performance assessor 326 that determines general packet-based performance of cellular network, possibly in conjunction with other network 122. The general packet-based performance includes metrics such as lost packets and packet delay. In real time video, packets are buffered at the receiver and sorted, in case they arrive out of order, and then sent for decoding. However, to maintain the timeliness of the video stream (e.g., live or real-time), the buffering has a time-out limit, such as 200 milliseconds (ms). If a packet arrives too late, it is dropped, and the result is the same as if the packet is lost: the reconstructed video will be blurred, jerky, or otherwise degraded. Network performance assessor 326 generates cellular network feedback 118 and transmits cellular network feedback 118 to cellular network 400.

FIG. 4 illustrates further detail for cellular network 400. Cellular network 400 receives encoded live action video streams 106a-106c, reference video streams 116a and 116b, identification 216a of reference video stream 116a, and identification 216b of reference video stream 116b from video encoder node 200 through air interface 120 and sends video encoding parameter feedback 112 to video encoder node 200 through air interface 120. On the opposing end, cellular network 400 sends (transmits) encoded live action video streams 106a-106c, reference video streams 116a and 116b, identification 216a of reference video stream 116a, and identification 216b of reference video stream 116b to video decoder node 300, possibly other network 122, and receives video encoding parameter feedback 112 and cellular network feedback 118 from video decoder node 300.

Cellular network 400 couples with air interface 120 through a base station 402, which may be a part of a radio access network (RAN). Cellular network 400 has a session management node 404, which in some examples (such as 5G), comprises a session management function (SMF). Session management node 404 manages connectivity and traffic routing of user data packets through cellular network 400, for example, using a packet transmission parameter 406. Packet transmission parameter 406 may specify packet priority for data traffic from video encoder node 200 (specifically, from cellular modem 220), and or routing of data traffic through the various nodes of cellular network 400.

In some examples, packet traffic through cellular network 400 is encrypted, so cellular network 400 has no visibility into video quality. In such examples, the contribution of cellular network 400 to improving the quality of the video streams received by video decoder node 300 is adjusting packet transmission parameter 406 in response to receiving cellular network feedback 118. For example, session management node 404 may increase packet priority for packets routed from video encoder node 200 to video decoder node 300. Even if the packets are encrypted, the packet headers, which specify origination and destination, are visible to cellular network 400.

Additionally, session management node 404 may reroute packets through cellular network 400 in response to receiving cellular network feedback 118. For example, cellular network 400 is illustrated as having a packet routing node 410, which may be a first user plane function (UPF) in communication with base station 402, and a packet routing node 412 which may be another UPF in communication with base station 402. Cellular network 400 is also illustrated as having a packet routing node 414, which may be a first packet data network gateway (PGW) in communication with other network 122, and a packet routing node 416 which may be another PGW in communication with other network 122.

A first path 420 traverses base station 402, packet routing node 410, and packet routing node 414. A second path 422 traverses base station 402, packet routing node 412, and packet routing node 416. If data traffic from video encoder node 200 to video decoder node 300 is initially using path 420, and cellular network feedback 118 indicates to session management node 404 that there is significant packet loss and/or packet delay, session management node 404 may reroute data traffic from video encoder node 200 to video decoder node 300 through path 422.

FIGS. 5A-5D together illustrate a flowchart 500 of exemplary operations associated with end-to-end emergency call testing by architecture 100 (e.g., flowchart 500 spans FIGS. 5A, 5B, 5C, and 5D). In some examples, at least a portion of flowchart 500 is performed using one or more computing devices 900 of FIG. 9. FIGS. 5A-5D are each divided into three portions: one portion for operations performed by video encoder node 200 and video cameras 102a-102, one portion for operations performed by cellular network 400, and one portion for operations performed by video decoder node 300 and cloud video service 128. This permits easy identification of how the various components of architecture 100 interact.

Flowchart 500 commences with video cameras 102a-102c capturing and storing live action video in operation 502. In operation 504, video cameras 102a-102c transmit live action video as live action video streams 106a-106c to video encoder 202, and video encoder node 200 receives live action video streams 106a-106c from video cameras 102a-102c in operation 506. Operations 502-506 remain ongoing through the remainder of flowchart 500.

In operation 508, video encoder node 200 selects reference video streams 116a and 116b from plurality of reference video streams 206, based on at least a similarity between each of reference video streams 116a and 116b and a respective one of live action video streams 106a and 106b. In operation 510, video encoder node 200 identifies reference video streams 116a and 116b to video decoder node 300 (e.g., using identifications 216a and 216b).

Video encoder node 200, using video encoder 202, encodes each of live action video stream 106a and reference video stream 116a according to video encoding parameters 210 in operation 512. In some examples, video encoder node 200, also encodes each of live action video stream 106b, live action video stream 106c, and reference video stream 116b according to the same video encoding parameters 210 in operation 512. In operation 514, video encoder node 200 transmits encoded live action video streams 106a-106c and encoded reference video streams 116a and 116b to video decoder node 300 across cellular network 400. Operations 512 and 514 remain ongoing through operation 550 of flowchart 500, when the video encoding parameters are changed.

In operation 516, cellular network 400 receives encoded live action video streams 106a-106c, encoded reference video streams 116a and 116b, and identifications 216a and 216b of reference video streams 116a and 116b from video encoder node 200. In some examples, during the first pass of flowchart 500 through operation 516, live action video streams 106a-106c and reference video streams 116a and 116b are encoded to set of video encoding parameters 210. In some examples, during the next pass of flowchart 500 through operation 516 (i.e., upon returning from operation 554), live action video streams 106a-106c and reference video streams 116a and 116b are encoded to set of video encoding parameters 212.

Cellular network 400 transmits encoded live action video streams 106a-106c, encoded reference video streams 116a and 116b, and identifications 216a and 216b of reference video streams 116a and 116b to video decoder node 300 in operation 518. Operations 516 and 517 remain ongoing through the remainder of flowchart 500, although identification 216a of reference video stream 116a and identification 216 of reference video stream 116b may be transmitted only a single time.

Video decoder node 300 receives identification 216a of reference video stream 116a and identification 216b of reference video stream 116b in operation 520. In operation 522, video decoder node 300, using comparison video stream selector 304, selects comparison video stream 316a and 316b, based on at least identifications 216a and 216b.

In operation 524, video decoder node 300 receives encoded live action video streams 106a-106c and encoded reference video streams 116a and 116b from video encoder node 200 (through cellular network 400). Video decoder node 300, using video decoder 302, decodes encoded live action video streams 106a-106c and encoded reference video streams 116a and 116b. Cloud video service 128 distributes live action video streams 106a-106c among disparate locations in video distribution environment 130 in operation 528. Operations 524-528 remain ongoing through the remainder of flowchart 500.

In operation 530, video decoder node 300 compares reference video stream 116a with comparison video stream 316a and also compares reference video stream 116b with comparison video stream 316b, using video quality assessor 320. Based on at least the comparisons, video decoder node 300 determines video encoding parameter feedback 112 in operation 532 and transmits video encoding parameter feedback 112 to video encoder node 200 in operation 534.

In operation 536, video decoder node 300 determines cellular network feedback 118, based on at least receiving encoded live action video streams 106a-106c and encoded reference video streams 116a and 116b, and transmits cellular network feedback 118 to cellular network 400 in operation 538. In some examples, cellular network feedback 118 comprises an indication of missing packets and/or an indication of packet delay.

Cellular network receives video encoding parameter feedback 112 from video decoder node 300 in operation 540 and transmits video encoding parameter feedback 112 to video encoder node 200 in operation 542. Cellular network receives cellular network feedback 118 from video decoder node 300 in operation 544, and adjusts at least one packet transmission parameter (e.g., packet transmission parameter 406 for data traffic from video encoder node 200 to video decoder node 300) in operation 546, based on at least receiving cellular network feedback 118. In some examples, adjusting at least one packet transmission parameter comprises adjusting packet priority and/or rerouting the data traffic from video encoder node 200 to video decoder node 300 within cellular network 400.

Video encoder node 200 receives video encoding parameter feedback 112 from video decoder node 300 (through cellular network 400) in operation 548. In operation 550, video encoder node 200 sets a new set of video encoding parameters (e.g., set of video encoding parameters 212, based on at least video encoding parameter feedback 112.

Video encoder node 200 continues to receive live action video as live action video streams 106a-106c from cameras 104a-104c, because operations 502-506 have remained ongoing. In operation 552, video encoder node 200 encodes each of live action video streams 106a-106c and reference video streams 116a and 116b according to set of video encoding parameters 212 (the new set of parameters), and further transmits encoded live action video streams 106a-106c and encoded reference video streams 116a and 116b to video decoder node 300 in operation 554. Operations 552 and 554 remain ongoing while flowchart 500 returns to operation 516, to encode the video streams with the new video encoding parameters.

FIG. 6 illustrates a flowchart 600 of exemplary operations associated with examples of architecture 100. In some examples, at least a portion of flowchart 600 may be performed using one or more computing devices 900 of FIG. 9. Flowchart 600 commences with operation 602, which includes receiving, by a video encoder node, from a first video camera, a first live action video stream. Operation 604 includes selecting a first reference video stream. Operation 606 includes encoding each of the first live action video stream and the first reference video stream according to a first set of video encoding parameters. Operation 608 includes transmitting, to a video decoder node across a cellular network, the encoded first live action video stream and the encoded first reference video stream.

Operation 610 includes receiving, from the video decoder node, video encoding parameter feedback. Operation 612 includes based on at least the video encoding parameter feedback, setting a second set of video encoding parameters. Operation 614 includes encoding each of the first live action video stream and the first reference video stream according to the second set of video encoding parameters. Operation 616 includes further transmitting, to the video decoder node, the encoded first live action video stream and the encoded first reference video stream.

Figure 7:
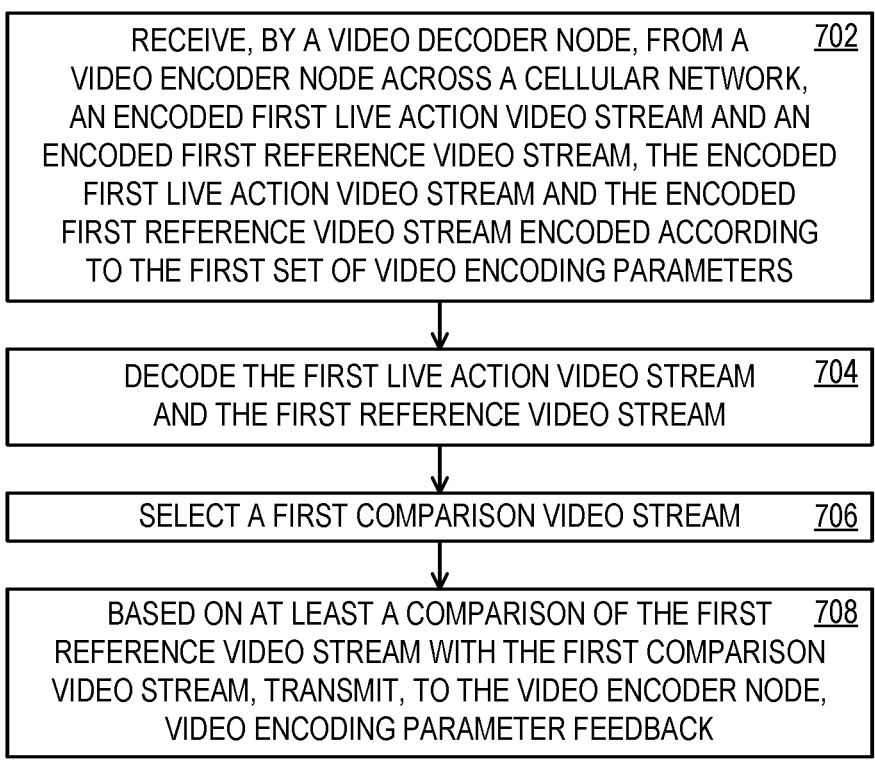

FIG. 7 illustrates a flowchart 700 of exemplary operations associated with examples of architecture 100. In some examples, at least a portion of flowchart 700 may be performed using one or more computing devices 900 of FIG. 9. Flowchart 700 commences with operation 702, which includes receiving, by a video decoder node, from a video encoder node across a cellular network, an encoded first live action video stream and an encoded first reference video stream, the encoded first live action video stream and the encoded first reference video stream encoded according to the first set of video encoding parameters.

Operation 704 includes decoding the first live action video stream and the first reference video stream. Operation 706 includes selecting a first comparison video stream. Operation 708 includes based on at least a comparison of the first reference video stream with the first comparison video stream, transmitting, to the video encoder node, video encoding parameter feedback.

Figure 8:
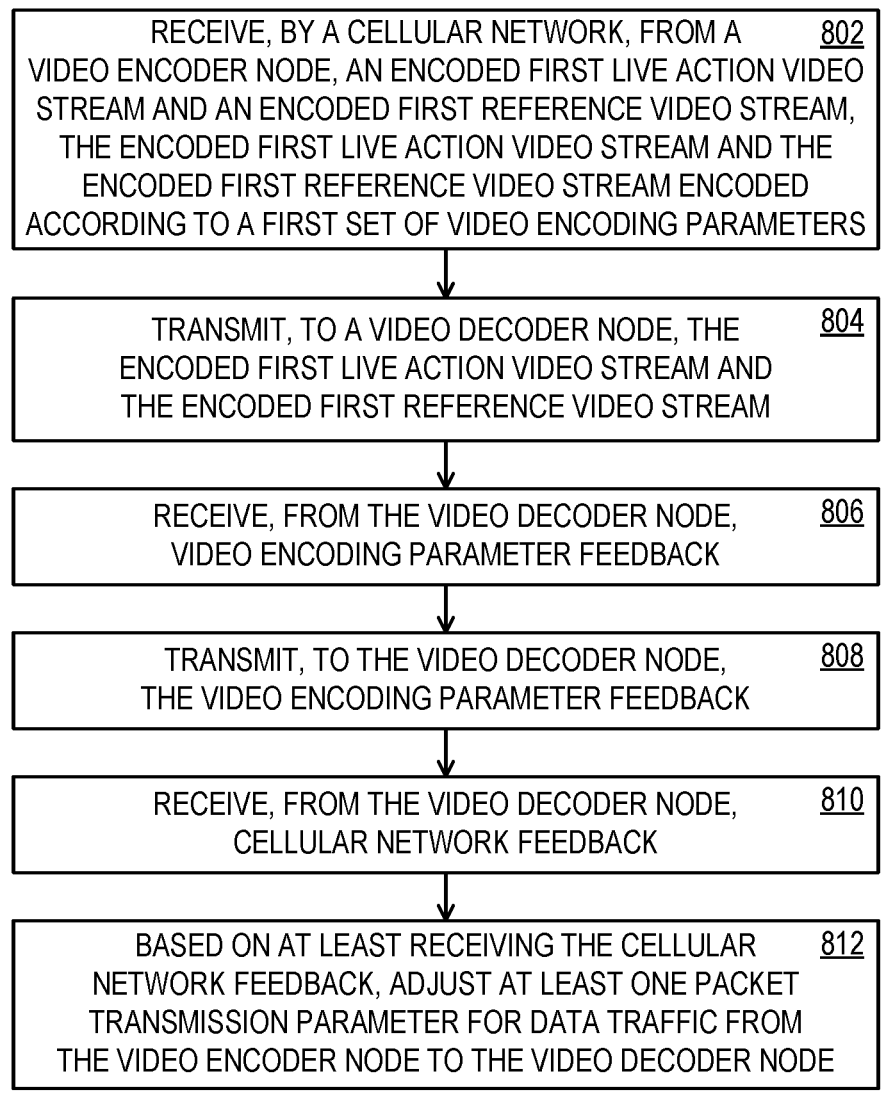

FIG. 8 illustrates a flowchart 800 of exemplary operations associated with examples of architecture 100. In some examples, at least a portion of flowchart 800 may be performed using one or more computing devices 900 of FIG. 9. Flowchart 800 commences with operation 802, which includes receiving, by a cellular network, from a video encoder node, an encoded first live action video stream and an encoded first reference video stream, the encoded first live action video stream and the encoded first reference video stream encoded according to a first set of video encoding parameters.

Operation 804 includes transmitting, to a video decoder node, the encoded first live action video stream and the encoded first reference video stream. Operation 806 includes receiving, from the video decoder node, video encoding parameter feedback. Operation 808 includes transmitting, to the video encoder node, the video encoding parameter feedback. Operation 810 includes receiving, from the video decoder node, cellular network feedback. Operation 812 includes based on at least receiving the cellular network feedback, adjusting at least one packet transmission parameter for data traffic from the video encoder node to the video decoder node.

Figure 9:
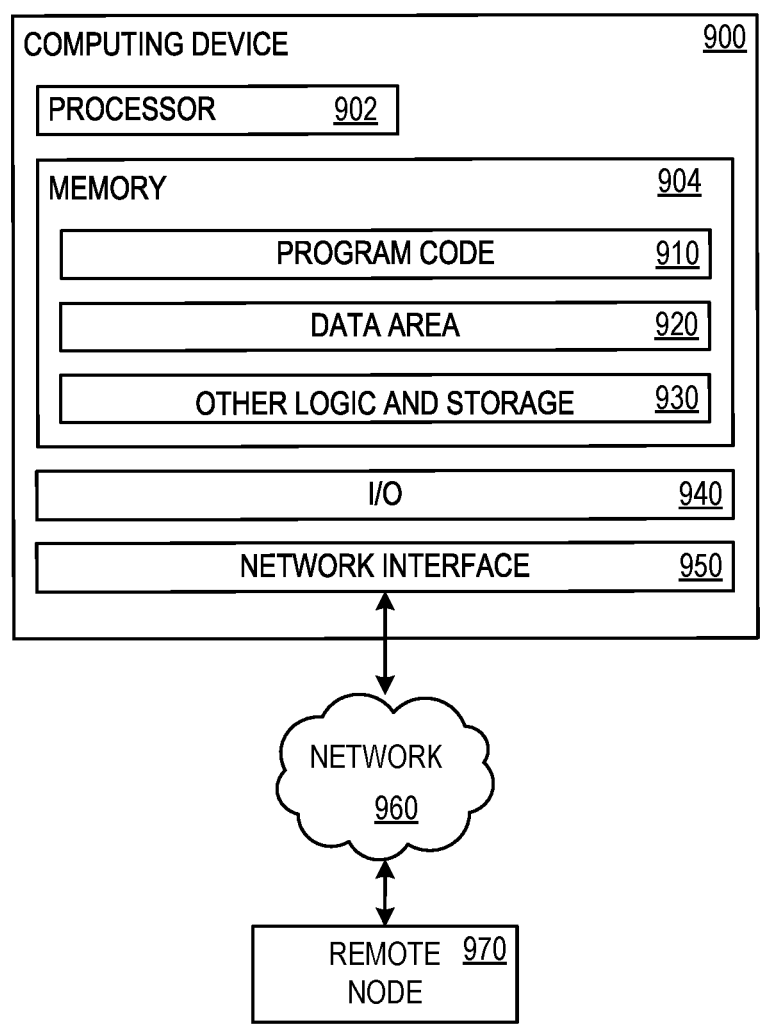
FIG. 9 illustrates a block diagram of a computing device suitable for implementing various aspects of the disclosure.

FIG. 9 illustrates a block diagram of computing device 900 that may be used as any component described herein that may require computational or storage capacity. Computing device 900 has at least a processor 902 and a memory 904 that holds program code 910, data area 920, and other logic and storage 930. Memory 904 is any device allowing information, such as computer executable instructions and/or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including any instructions necessary to perform operations described herein. Data area 920 holds any data necessary to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices. A network interface 950 permits communication over a network 960 with a remote node 970, which may represent another implementation of computing device 900. For example, a remote node 970 may represent another of the above-noted nodes within architecture 100.

Additional Examples

A method of video distribution comprises: receiving, by a video encoder node, from a first video camera, a first live action video stream; selecting a first reference video stream; encoding each of the first live action video stream and the first reference video stream according to a first set of video encoding parameters; transmitting, to a video decoder node across a cellular network, the encoded first live action video stream and the encoded first reference video stream; receiving, from the video decoder node, video encoding parameter feedback; based on at least the video encoding parameter feedback, setting a second set of video encoding parameters; encoding each of the first live action video stream and the first reference video stream according to the second set of video encoding parameters; and further transmitting, to the video decoder node, the encoded first live action video stream and the encoded first reference video stream.

Another method of video distribution comprises: receiving, by a video decoder node, from a video encoder node across a cellular network, an encoded first live action video stream and an encoded first reference video stream, the encoded second live action video stream and the encoded second reference video stream encoded according to the first set of video encoding parameters; decoding the first live action video stream and the first reference video stream; selecting a first comparison video stream; and based on at least a comparison of the first reference video stream with the first comparison video stream, transmitting, to the video encoder node, video encoding parameter feedback.

Another method of video distribution comprises: receiving, by a cellular network, from a video encoder node, an encoded first live action video stream and an encoded first reference video stream, the encoded first live action video stream and the encoded first reference video stream encoded according to a first set of video encoding parameters; transmitting, to a video decoder node, the encoded first live action video stream and the encoded first reference video stream; receiving, from the video decoder node, video encoding parameter feedback; transmitting, to a video decoder node, the video encoding parameter feedback; receiving, from the video decoder node, cellular network feedback; and based on at least receiving the cellular network feedback, adjusting at least one packet transmission parameter for data traffic from the video encoder node to the video decoder node.

A system for video distribution comprises: a processor; and a computer-readable medium storing instructions that are operative upon execution by the processor to: receive, by a video encoder node, from a first video camera, a first live action video stream; select a first reference video stream; encode each of the first live action video stream and the first reference video stream according to a first set of video encoding parameters; transmit, to a video decoder node across a cellular network, the encoded first live action video stream and the encoded first reference video stream; receive, from the video decoder node, video encoding parameter feedback; based on at least the video encoding parameter feedback, set a second set of video encoding parameters; encode each of the first live action video stream and the first reference video stream according to the second set of video encoding parameters; and further transmit, to the video decoder node, the encoded first live action video stream and the encoded first reference video stream.

Another system for video distribution comprises: a processor; and a computer-readable medium storing instructions that are operative upon execution by the processor to: receive, by a video decoder node, from a video encoder node across a cellular network, an encoded first live action video stream and an encoded first reference video stream, the encoded second live action video stream and the encoded second reference video stream encoded according to the first set of video encoding parameters; decode the first live action video stream and the first reference video stream; select a first comparison video stream; and based on at least a comparison of the first reference video stream with the first comparison video stream, transmit, to the video encoder node, video encoding parameter feedback.

Another system for video distribution comprises: a processor; and a computer-readable medium storing instructions that are operative upon execution by the processor to: receive, by a cellular network, from a video encoder node, an encoded first live action video stream and an encoded first reference video stream, the encoded first live action video stream and the encoded first reference video stream encoded according to a first set of video encoding parameters; transmit, to a video decoder node, the encoded first live action video stream and the encoded first reference video stream; receive, from the video decoder node, video encoding parameter feedback; transmit, to the video encoder node, the video encoding parameter feedback; receive, from the video decoder node, cellular network feedback; and based on at least receiving the cellular network feedback, adjust at least one packet transmission parameter for data traffic from the video encoder node to the video decoder node.

One or more example computer storage devices has computer-executable instructions stored thereon, which, upon execution by a computer, cause the computer to perform operations comprising: receiving, by a video encoder node, from a first video camera, a first live action video stream; selecting a first reference video stream; encoding each of the first live action video stream and the first reference video stream according to a first set of video encoding parameters; transmitting, to a video decoder node across a cellular network, the encoded first live action video stream and the encoded first reference video stream; receiving, from the video decoder node, video encoding parameter feedback; based on at least the video encoding parameter feedback, setting a second set of video encoding parameters; encoding each of the first live action video stream and the first reference video stream according to the second set of video encoding parameters; and further transmitting, to the video decoder node, the encoded first live action video stream and the encoded first reference video stream.

One or more additional example computer storage devices has computer-executable instructions stored thereon, which, upon execution by a computer, cause the computer to perform operations comprising: receiving, by a video decoder node, from a video encoder node across a cellular network, an encoded first live action video stream and an encoded first reference video stream, the encoded first live action video stream and the encoded first reference video stream encoded according to the first set of video encoding parameters; decoding the first live action video stream and the first reference video stream; selecting a first comparison video stream; and based on at least a comparison of the first reference video stream with the first comparison video stream, transmitting, to the video encoder node, video encoding parameter feedback.

One or more additional example computer storage devices has computer-executable instructions stored thereon, which, upon execution by a computer, cause the computer to perform operations comprising: receiving, by a cellular network, from a video encoder node, an encoded first live action video stream and an encoded first reference video stream, the encoded first live action video stream and the encoded first reference video stream encoded according to a first set of video encoding parameters; transmitting, to a video decoder node, the encoded first live action video stream and the encoded first reference video stream; receiving, from the video decoder node, video encoding parameter feedback; and transmitting, to a video decoder node, the video encoding parameter feedback; receiving, from the video decoder node, cellular network feedback; and based on at least receiving the cellular network feedback, adjusting at least one packet transmission parameter for data traffic from the video encoder node to the video decoder node.

Alternatively, or in addition to the other examples described herein, examples include any combination of the following:

the first set of video encoding parameters comprises at least two parameters selected from the list consisting of bit rate, compression codec identification, resolution, frame rate, bit depth, and key frame interval;

the second set of video encoding parameters comprises at least two parameters selected from the list consisting of bit rate, compression codec identification, resolution, frame rate, bit depth, and key frame interval;

receiving, from a second video camera, a second live action video stream;

selecting a second reference video stream;

encoding each of the second live action video stream and the second reference video stream according to the encoding of the first live action video stream;

transmitting, to the video decoder node, the encoded second live action video stream and the encoded second reference video stream;

identifying, by the video encoder node, to the video decoder node, the first reference video stream;

the video encoding parameter feedback comprises parameter adjustments;

the video encoding parameter feedback comprises video quality metrics;

receiving, by the cellular network, from the video encoder node, identification of the first and second reference video streams;

transmitting, by the cellular network, to the video decoder node, the identification of the first and second reference video streams;

encoding each of the second live action video stream and the second reference video stream according to the second set of video encoding parameters;

further transmitting, to the video decoder node, the encoded second live action video stream and the encoded second reference video stream;

receiving, from the video encoder node, an encoded second live action video stream and an encoded second reference video stream from across a cellular network;

decoding the second live action video stream and the second reference video stream;

selecting a second comparison video stream, wherein the video encoding parameter feedback is based on at least the comparison of the first reference video stream with the first comparison video stream and a comparison of the second reference video stream with the second comparison video stream;

receiving, from the video encoder node, an identification of the first reference video stream;

the video encoding parameter feedback comprises parameter adjustments or video quality metrics;

based on at least receiving the encoded first live action video stream and the encoded first reference video stream, determining cellular network feedback;

transmitting, to the cellular network, the cellular network feedback;

the cellular network feedback comprises an indication of missing packets and/or an indication of packet delay;

receiving, by from the video encoder node, an encoded second live action video stream and an encoded second reference video stream, the encoded second live action video stream and the encoded second reference video stream encoded according to the first set of video encoding parameters;

transmitting, to the video decoder node, the encoded second live action video stream and the encoded second reference video stream;

the cellular network comprises a 5G cellular network;

the cellular network feedback comprises an indication of missing packets and/or an indication of packet delay;
adjusting at least one packet transmission parameter comprises adjusting packet priority;
adjusting at least one packet transmission parameter comprises rerouting the data traffic from the video encoder node to the video decoder node within the cellular network;
capturing and storing, by the first video camera and the second video camera, live action video;
transmitting, by the first video camera, to the video encoder, live action video as the first live action video stream;
transmitting, by the second video camera, to the video encoder, live action video as the second live action video stream;
selecting the first reference video stream from a plurality of reference video streams based on at least a similarity between the first reference video stream and the first live action video stream;
selecting the second reference video stream from the plurality of reference video streams based on at least a similarity between the second reference video stream and the second live action video stream;
identifying, by the video encoder node, to the video decoder node, the second reference video stream;
receiving, by the video decoder node, from the video encoder node, an identification of the second reference video stream;
selecting the first comparison video stream based on at least the identification of the first reference video stream;
selecting the second comparison video stream based on at least the identification of the first reference video stream;
comparing the first reference video stream with the first comparison video stream;
comparing the second reference video stream with the second comparison video stream;
based on at least the comparison of the first reference video stream with the first comparison video stream, determining the video encoding parameter feedback; and
based on at least the comparison of the first reference video stream with the first comparison video stream and the comparison of the second reference video stream with the second comparison video stream, determining the video encoding parameter feedback.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of video distribution, the method comprising:
receiving, by a video encoder node, from a first video camera, a first live action video stream;
selecting a first reference video stream, the first reference video stream including different content than the first live action video stream;
encoding each of the first live action video stream and the first reference video stream according to a first set of video encoding parameters to obtain a first encoded first live action video stream and a first encoded first reference video stream;
transmitting, to a video decoder node across a cellular network, the first encoded first live action video stream and the first encoded first reference video stream;
receiving, from the video decoder node, video encoding parameter feedback corresponding to the first reference video stream, wherein the video encoding parameter feedback is generated based on a comparison of a decoded version of the first encoded first reference video stream and a local copy of the first reference video stream;
based on at least the video encoding parameter feedback, setting a second set of video encoding parameters for the first live action video stream;
encoding each of the first live action video stream and the first reference video stream according to the second set of video encoding parameters to obtain a second encoded first live action video stream and a second encoded first reference video stream; and
transmitting, to the video decoder node, the second encoded first live action video stream and the second encoded first reference video stream.

2. The method of claim 1, wherein the first set of video encoding parameters and the second set of video encoding parameters each comprises at least two parameters selected from the list consisting of:
bit rate, compression codec identification, resolution, frame rate, bit depth, and key frame interval.

3. The method of claim 1, further comprising:
receiving, from a second video camera, a second live action video stream;
selecting a second reference video stream;
encoding each of the second live action video stream and the second reference video stream according to the encoding of the first live action video stream to obtain a first encoded second live action video stream and a first encoded second reference video stream; and
transmitting, to the video decoder node, the first encoded second live action video stream and the first encoded second reference video stream.

4. The method of claim 3, further comprising:
encoding each of the second live action video stream and the second reference video stream according to the second set of video encoding parameters to obtain a second encoded second live action video stream and a second encoded second reference video stream; and further transmitting, to the video decoder node, the second encoded second live action video stream and the second encoded second reference video stream.

5. The method of claim 1, further comprising:
identifying, by the video encoder node, to the video decoder node, the first reference video stream.

6. The method of claim 1, wherein the video encoding parameter feedback comprises parameter adjustments.

7. The method of claim 1, wherein the video encoding parameter feedback comprises video quality metrics.

8. A system comprising:
a processor; and
a computer-readable medium storing programming instructions that, when executed by the processor, cause the processor to:
receive from a first video camera, a first live action video stream;
select a first reference video stream, the first reference video stream including different content than the first live action video stream;
encode each of the first live action video stream and the first reference video stream according to a first set of video encoding parameters to obtain a first encoded first live action video stream and a first encoded first reference video stream;
transmit, to a video decoder node across a cellular network, the first encoded first live action video stream and the first encoded first reference video stream;
receive, from the video decoder node, video encoding parameter feedback corresponding to the first reference video stream, wherein the video encoding parameter feedback is generated based on a comparison of a decoded version of the first encoded first reference video stream and a local copy of the first reference video stream;
based on at least the video encoding parameter feedback, set a second set of video encoding parameters for the first live action video stream;
encode each of the first live action video stream and the first reference video stream according to the second set of video encoding parameters to obtain a second encoded first live action video stream and a second encoded first reference video stream; and
transmit, to the video decoder node, the second encoded first live action video stream and the second encoded first reference video stream.

9. The system of claim 8, wherein the first set of video encoding parameters and the second set of video encoding parameters each comprises at least two parameters selected from the list consisting of:
bit rate, compression codec identification, resolution, frame rate, bit depth, and key frame interval.

10. The system of claim 8, wherein the programming instructions further cause the processor to:
identify the first reference video stream to the video decoder node.

11. The system of claim 8, wherein the video encoding parameter feedback comprises parameter adjustments.

12. The system of claim 8, wherein the video encoding parameter feedback comprises video quality metrics.

13. A computer program product that includes a computer-readable medium memory storing programming instructions that, when executed by a processor, cause the processor to:
receive from a first video camera, a first live action video stream;
select a first reference video stream, the first reference video stream including different content than the first live action video stream;
encode each of the first live action video stream and the first reference video stream according to a first set of video encoding parameters to obtain a first encoded first live action video stream and a first encoded first reference video stream;
transmit, to a video decoder node across a cellular network, the first encoded first live action video stream and the first encoded first reference video stream;
receive, from the video decoder node, video encoding parameter feedback corresponding to the first reference video stream, wherein the video encoding parameter feedback is generated based on a comparison of a decoded version of the first encoded first reference video stream and a local copy of the first reference video stream;
based on at least the video encoding parameter feedback, set a second set of video encoding parameters for the first live action video stream;
encode each of the first live action video stream and the first reference video stream according to the second set of video encoding parameters to obtain a second encoded first live action video stream and a second encoded first reference video stream; and
transmit, to the video decoder node, the second encoded first live action video stream and the second encoded first reference video stream.

14. The computer program product of claim 13, wherein the first set of video encoding parameters and the second set of video encoding parameters each comprises at least two parameters selected from the list consisting of:
bit rate, compression codec identification, resolution, frame rate, bit depth, and key frame interval.

15. The computer program product of claim 13, wherein the programming instructions further cause the processor to:
identify the first reference video stream to the video decoder node.

16. The computer program product of claim 13, wherein the video encoding parameter feedback comprises parameter adjustments.

17. The computer program product of claim 13, wherein the video encoding parameter feedback comprises video quality metrics.

* * * * *